(12) United States Patent
Takahashi

(10) Patent No.: US 8,858,083 B2
(45) Date of Patent: Oct. 14, 2014

(54) MOTION GUIDE DEVICE

(75) Inventor: Toru Takahashi, Tokyo (JP)

(73) Assignee: THK Co., Ltd., Tokyo (JP)

( * ) Notice: Subject to any disclaimer, the term of this patent is extended or adjusted under 35 U.S.C. 154(b) by 0 days.

(21) Appl. No.: 13/885,932

(22) PCT Filed: Dec. 1, 2011

(86) PCT No.: PCT/JP2011/077826
§ 371 (c)(1),
(2), (4) Date: May 16, 2013

(87) PCT Pub. No.: WO2012/074066
PCT Pub. Date: Jun. 7, 2012

(65) Prior Publication Data
US 2013/0236133 A1    Sep. 12, 2013

(30) Foreign Application Priority Data

Dec. 2, 2010   (JP) ................................ 2010-269258
Dec. 28, 2010   (JP) ................................ 2010-292513

(51) Int. Cl.
*F16C 29/06* (2006.01)
*F16C 33/37* (2006.01)
*F16C 33/38* (2006.01)

(52) U.S. Cl.
CPC ......... *F16C 29/0611* (2013.01); *F16C 33/3706* (2013.01); *F16C 33/3825* (2013.01); *F16C 29/0647* (2013.01)
USPC .......................................................... 384/45

(58) Field of Classification Search
CPC .. F16C 29/06; F16C 29/0604; F16C 29/0609; F16C 29/0611; F16C 33/37; F16C 29/0647; F16C 33/3706
USPC ............................................. 384/43, 45, 520
See application file for complete search history.

(56) References Cited

U.S. PATENT DOCUMENTS 4,652,147 A    3/1987   Geka
5,927,858 A *   7/1999   Agari .............................. 384/45

(Continued)

FOREIGN PATENT DOCUMENTS

JP    62-004922 A    1/1987
JP    2000-304046 A   10/2000

(Continued)

OTHER PUBLICATIONS

International Search Report for PCT/JP2011/077826, mailing date of Jan. 10, 2012.

*Primary Examiner* — Phillip A Johnson
(74) *Attorney, Agent, or Firm* — Westerman, Hattori, Daniels & Adrian, LLP

(57) ABSTRACT

The motion guide device includes: a raceway rail; a moving block including an endless circulation path for rolling elements; and spacers interposed in the endless circulation path of the moving block. The moving block includes: a block body including: a load rolling element path for the rolling elements; and a rolling element return path parallel to the load rolling element path; and turning path forming members fixed to the block body. The turning path forming member includes a direction turning path for coupling the load rolling element path and the rolling element return path to each other. The direction turning path includes: a turning portion for continuously varying a rolling direction of the rolling elements; and a preliminary turning portion which allows the spacers to move in a curved form while linearly guiding the rolling elements.

11 Claims, 13 Drawing Sheets

(56) References Cited

U.S. PATENT DOCUMENTS

| | | |
|---|---|---|
| 7,014,364 B2 * | 3/2006 | Kasuga et al. .................. 384/45 |
| 2001/0012415 A1 | 8/2001 | Kasuga et al. |
| 2003/0194160 A1 | 10/2003 | Yabe et al. |
| 2006/0029305 A1 | 2/2006 | Akiyama et al. |
| 2007/0076989 A1 | 4/2007 | Matsumoto et al. |

FOREIGN PATENT DOCUMENTS

| | | |
|---|---|---|
| JP | 2001-182745 A | 7/2001 |
| JP | 2004-108474 A | 4/2004 |
| JP | 2005-264984 A | 9/2005 |
| JP | 2007-092899 A | 4/2007 |

* cited by examiner

MOTION GUIDE DEVICE

TECHNICAL FIELD

The present invention relates to a motion guide device incorporating a large number of spacers for holding rolling elements in a freely rotatable manner in an endless circulation path for the rolling elements.

BACKGROUND ART

As a motion guide device of this type, there has been known one disclosed in Patent Literature 1. The motion guide device includes a raceway rail including rolling surfaces for rolling elements formed along a longitudinal direction, a moving block assembled to the raceway rail through intermediation of a large number of rolling elements which roll on the rolling surface and including an endless circulation path for the rolling elements, and a plurality of separators to be moved together with the rolling elements in the endless circulation path of the moving block. Along with circulation of the rolling elements in the endless circulation path, the moving block and the raceway rail can reciprocate relative to each other.

The moving block includes a block body including load rolling element paths in which the rolling elements roll under load between the raceway rail and the moving block, and rolling element return paths provided parallel to the load rolling element paths, and a pair of end plates each including a pair of direction turning paths each connecting the load rolling element path and the rolling element return path to each other so as to form the endless circulation path, the pair of end plates being fixed to the block body. Further, the separators are arranged between the rolling elements in a manner that an axial line of each of the separators and a straight line connecting center points of adjacent the ones of the rolling elements to each other correspond to each other. Further, spherical seats in conformity with an outer peripheral shape of the rolling elements are formed on contact surfaces of each of the separators with respect to the rolling elements.

In the motion guide device of Patent Literature 1, which is structured as described above, when the rolling elements enter the direction turning path, the rolling elements roll in a circular-arc form along an outer peripheral side guide curved surface of the direction turning path. Meanwhile, the separators are arranged so that the axial line of each of the separators and the straight line connecting the center points of adjacent ones of the rolling elements to each other correspond to each other. Thus, at the same time when the rolling elements pass through a start position of the outer peripheral side guide curved surface of the direction turning path and start to roll along the outer peripheral side guide curved surface toward a direction of being spaced apart from the rolling surface of the raceway rail, the separators held in contact with the rolling elements through intermediation of the spherical seats gradually come closer to an inner peripheral side guide curved surface of the direction turning path with respect to the rolling elements. In order to prevent the separators and the inner peripheral side guide curved surface in the direction turning path from interfering with each other due to displacement of a track of the separators, in the motion guide device disclosed in Patent Literature 1, the inner peripheral side guide curved surface is formed into a compound curved surface including a plurality of curved surfaces having different curvatures.

CITATION LIST

Patent Literature

[PTL 1] JP 2000-304046 A

DISCLOSURE OF THE INVENTION

Problems to be Solved by the Invention

As for the motion guide device disclosed in Patent Literature 1, a parting plane of the block body and each of the end plates corresponds to a plane including a start position of the inner peripheral side guide curved surface of the direction turning path and the start position of the outer peripheral side guide curved surface of the direction turning path. In other words, the start position of the inner peripheral side guide curved surface of the direction turning path and the start position of the outer peripheral side guide curved surface of the direction turning path correspond to each other in a rolling direction of the rolling elements. Thus, when the rolling elements having rolled in the load rolling element path of the moving block start to roll along the outer peripheral side guide curved surface toward the direction of being spaced apart from the rolling surface of the raceway rail, the separators arranged between adjacent ones of the rolling elements gradually come closer to the inner peripheral side guide curved surface before reaching the start position of the inner peripheral side guide curved surface of the direction turning path.

As a result, in the motion guide device disclosed in Patent Literature 1, the inner peripheral side guide curved surface and the separators may have already interfered with each other at a time point when the separators reach the start position of the inner peripheral side guide curved surface formed on the compound curved surface. As a result, there has been a problem in that the rolling elements in the endless circulation path may be hindered from being smoothly circulated.

Means for Solving the Problems

The present invention has been made in view of the problem described above, and it is an object thereof to provide a motion guide device which prevents spacers from being worn through use over time, to thereby enable rolling elements to be smoothly circulated in an endless circulation path formed through a moving block.

In order to achieve the above-mentioned object, according to the present invention, there is provided a motion guide device, including: a raceway rail on which rolling elements roll along a longitudinal direction of the raceway rail; a moving block which is assembled to the raceway rail through intermediation of a large number of rolling elements, the moving block including an endless circulation path for the large number of rolling elements and being movable along the raceway rail; and spacers each interposed between adjacent ones of the large number of rolling elements in the endless circulation path of the moving block, in which the moving block includes: a block body including: a load rolling element path in which the large number of rolling elements roll under load between the moving block and the raceway rail; and a rolling element return path parallel to the load rolling element path; and a pair of turning path forming members fixed to the block body. Each of the pair of turning path forming members includes a direction turning path for coupling the load rolling element path and the rolling element return path to each other so as to form the endless circulation path. The direction turning path of each of the pair of turning path forming members includes: a turning portion for continuously varying a rolling direction of the large number of rolling elements; and a preliminary turning portion which is extended from the rolling element return path of the block body so as to couple the rolling element return path and the turning portion to each other, the preliminary turning portion allowing the spacers to move in a curved form while linearly guiding the large number of rolling elements.

Effects of the Invention

According to the motion guide device of the present invention, which is structured as described above, the direction turning path of each of the pair of turning path forming members includes the preliminary turning portion which allows the spacers to move in the curved form while linearly guiding the large number of rolling elements. With this, when the large number of rolling elements start to enter the direction turning path, the spacers and an inner peripheral side guide curved surface of the direction turning path can be prevented from interfering with each other. As a result, the large number of rolling elements can be smoothly circulated in the endless circulation path formed through the moving block.

MODE FOR CARRYING OUT THE INVENTION

In the following, detailed description is made of motion guide devices according to embodiments of the present invention with reference to the attached drawings.

Figure 1:
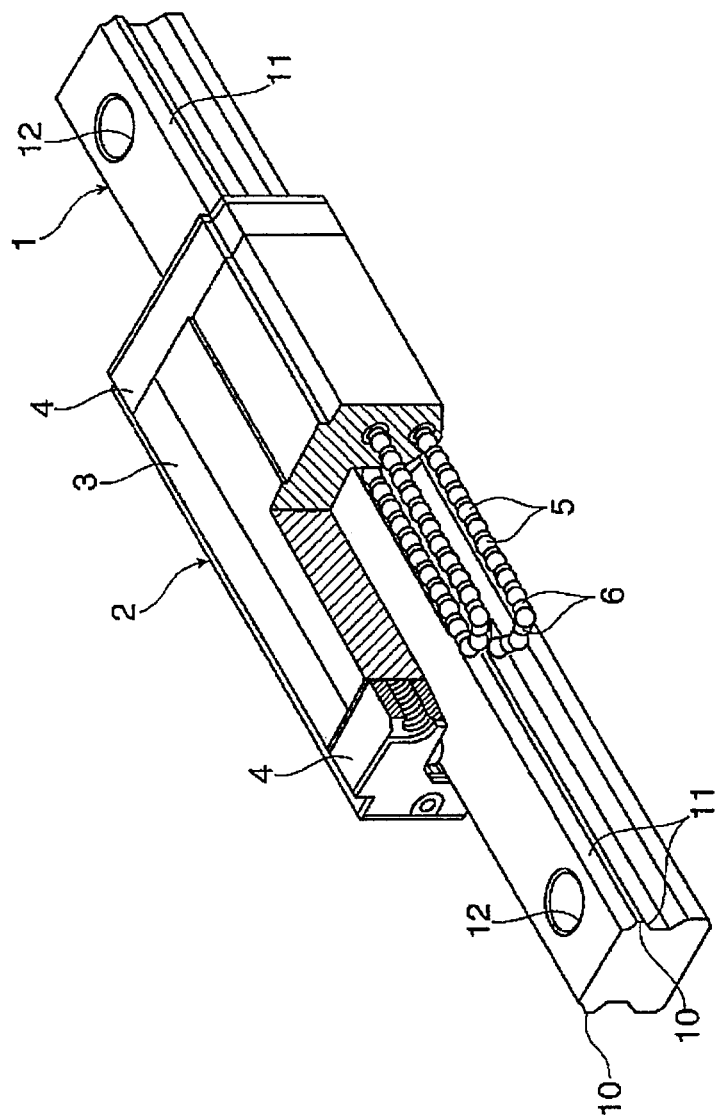
[FIG. 1] A perspective view of a motion guide device according to a first embodiment of the present invention.

FIG. 1 illustrates a motion guide device according to a first embodiment of the present invention, in which spacers are incorporated in an endless circulation path for rolling elements. The motion guide device includes a linearly extending raceway rail 1, and a moving block 2 assembled to the raceway rail 1 through intermediation of a large number of balls 5 as the rolling elements. The raceway rail 1 is set to a fixation portion, and various objects are mounted to the moving block 2. With this, the objects can be guided reciprocably along the raceway rail 1.

The raceway rail 1 is formed into an elongated shape substantially quadrangular in cross-section. The raceway rail 1 includes bolt mounting holes 12 formed therein, which pass therethrough from an upper surface to a bottom surface at predetermined intervals along a longitudinal direction. The raceway rail 1 can be firmly fixed to the fixation portion such as a bed and a column with fixing bolts inserted in the bolt mounting holes 12. Further, projecting portions 10 are provided respectively on both lateral side surfaces of the raceway rail 1 along the longitudinal direction. One ball rolling surface 11 is provided on each vertical side of each of the projecting portions 10. The raceway rail includes a total of four ball rolling surfaces 11 as a whole.

Meanwhile, the moving block 2 includes a block body 3, and a pair of lid members 4 mounted to both ends in a reciprocating direction of the block body 3. A sealing member is mounted to each of the lid members 4, and the sealing member seals off a gap between the lid member 4 and the raceway rail 1. With this, dust and the like, which adhere to the raceway rail 1, are prevented from intruding into an inside of the moving block 2.

Figure 2:
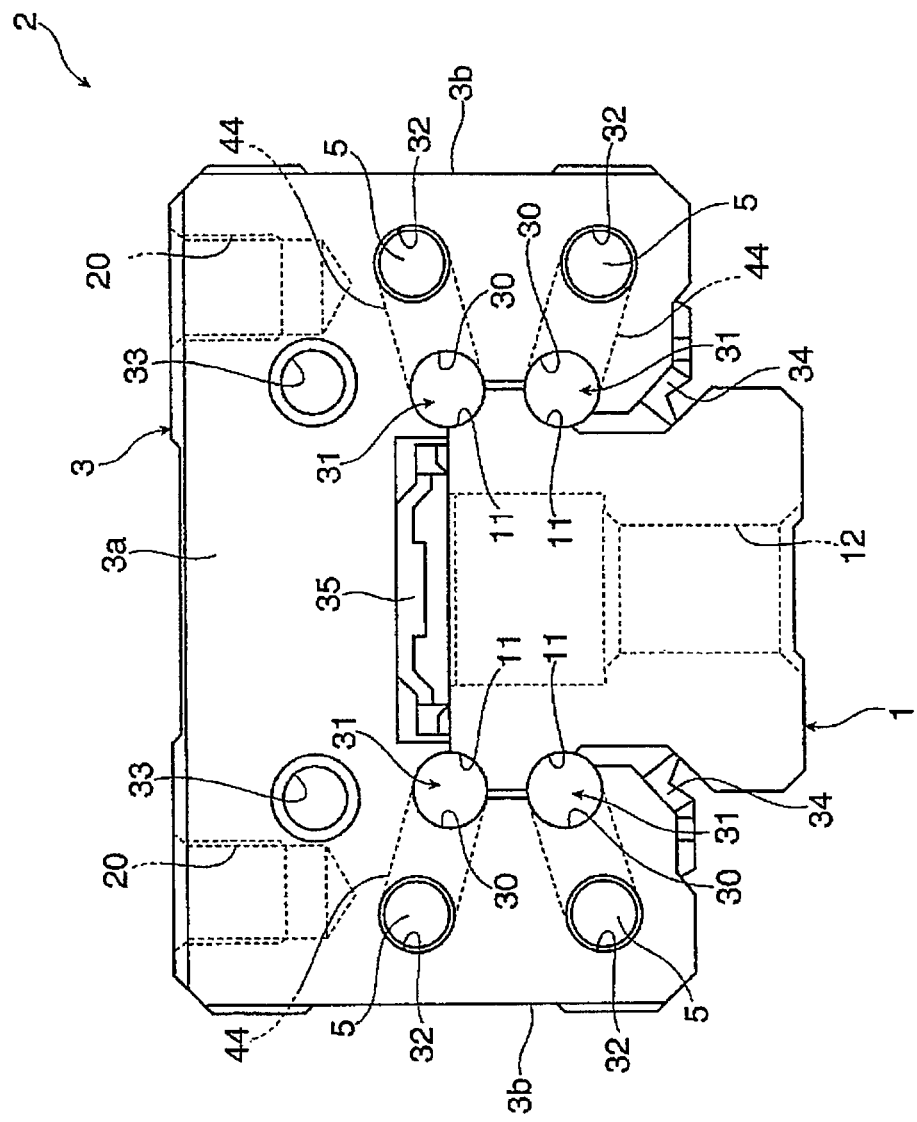
[FIG. 2] A front view in which a lid member is removed from the motion guide device illustrated in FIG. 1.

FIG. 2 is a front view in which the lid member 4 is removed from the motion guide device illustrated in FIG. 1. The block body 3 is formed into a substantially channel shape including a horizontal portion 3a facing the upper surface of the raceway rail 1 and a pair of skirt portions 3b facing both side surfaces of the raceway rail 1. An upper half of the raceway rail 1 is accommodated between the pair of skirt portions 3b. As illustrated in FIG. 1, the lid members 4 are formed into substantially the same shape as that of the block body 3 so as to be mounted to the end portions of the block body 3. Further, the horizontal portion 3a of the block body 3 includes tapped holes 20 for allowing the objects to be fixed with bolts.

On an inside of the skirt portions 3b, which face the raceway rail 1, load ball rolling surfaces 30 for the balls 5 are provided to face the ball rolling surfaces 11 of the raceway rail 1. The load ball rolling surfaces 30 and the ball rolling surfaces 11 of the raceway rail 1, which face each other, form load ball paths 31 as load rolling element paths in which the balls 5 roll under load between the raceway rail 1 and the moving block 2. The load ball rolling surfaces 30 include two load ball rolling surfaces 30 provided on an inner side surface of each of the skirt portions 3b, and the loadball paths 31 include four loadball paths 31 provided to the block body 3. Further, the skirt portions 3b each include ball return paths 32 as rolling element return paths corresponding to and substantially parallel to the load ball paths 31. The ball return paths 32 each have an inner diameter set to be slightly larger than a diameter of the balls 5. With this, the balls 5 roll under a load-free state in the ball return paths 32.

Further, the pair of lid members 4 fixed to both end surfaces of the block body 3 each include direction turning paths 44 coupling the load ball paths 31 and the ball return paths 32 to each other. With this, the balls 5 can be intercommunicated between the load ball path 31 and the ball return path 32. Specifically, in the motion guide device according to this embodiment, one lid member 4 includes four direction turning paths 44. Note that, in FIG. 2, reference numerals 33 represent tapped holes used for fixation of the lid member 4, reference numerals 34 represent sealing members for sealing off the gaps between the side surfaces of the raceway rail 1 and the skirt portions 3b of the block body 3, and reference numeral 35 represents a sealing member for sealing off the gap between the upper surface of the raceway rail 1 and the horizontal portion 3a of the block body 3.

Figure 3:
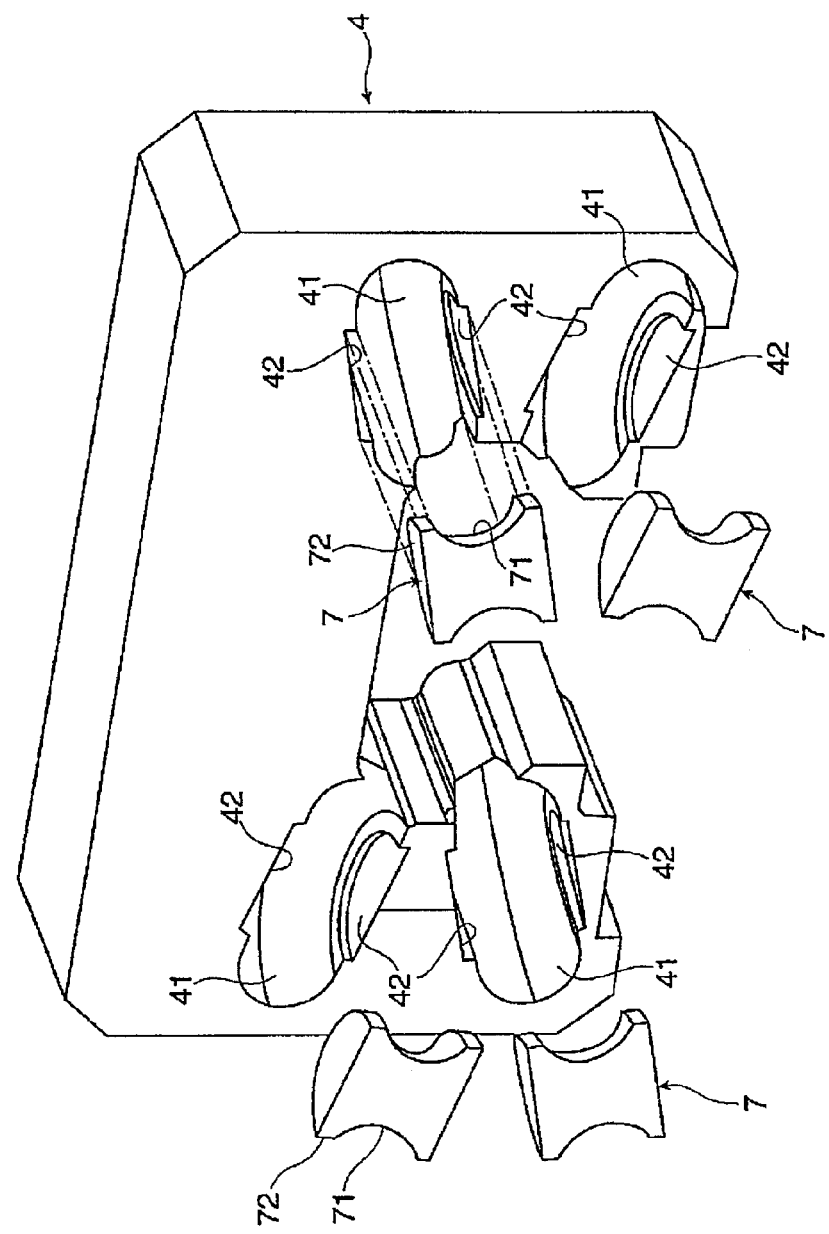
[FIG. 3] A perspective view illustrating a fitting relationship between the lid member and ball guide members.

As illustrated in FIG. 3, an abutment surface of the lid member 4 with respect to the block body 3 is provided with four substantially U-shaped outer peripheral side guide surfaces 41 forming the direction turning paths 44 for the balls 5 correspondingly to the load ball paths 31 and the ball return paths 32 of the block body 3. A pair of recessed grooves 42 are formed into a semicircular shape on an upper side and a lower side of each of the outer peripheral side guide surfaces 41. Further, the lid member 4 includes positioning bosses (not shown) corresponding to the tapped holes 33 of the block body 3 so that the lid member 4 can be easily positioned and fixed with respect to the block body 3 simply through fitting of the positioning bosses into the tapped holes 33 of the block body 3.

Figure 4:
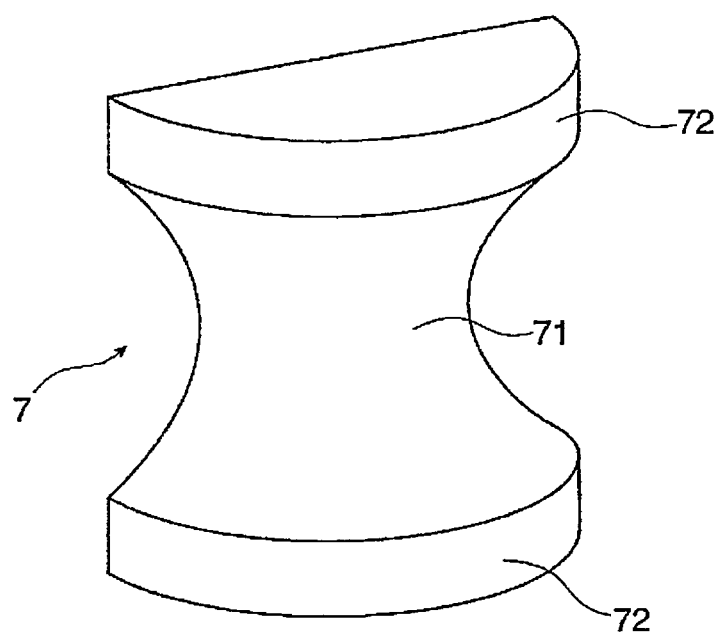
[FIG. 4] A perspective view of the ball guide member to be fitted to the lid member.

Between the end surface of the lid member 4 and the block body 3, which are structured as described above, ball guide members 7 are interposed as components of the direction turning paths for the balls 5. As illustrated in FIG. 4, the ball guide member 7 has an inner peripheral side guide curved surface 71 forming the direction turning path 44 for the balls 5, and includes a pair of projecting portions 72 to be fitted to the pair of recessed grooves 42 formed in the outer peripheral side guide surfaces 41 of the lid member 4. As illustrated in FIG. 3, when the projecting portions 72 of the ball guide member 7 are fitted into the recessed grooves 42 of the lid member 4, the direction turning path 44 having an inner diameter slightly larger than the diameter of the balls 5 is completed between the outer peripheral side guide surfaces 41 and the inner peripheral side guide curved surface 71. In other words, simply through fitting of the ball guide members 7 with respect to the lid member 4, the direction turning paths 44 for the balls 5 are completed.

When the lid members 4 each having the ball guide members 7 are fitted thereto mounted to both the ends in the reciprocating direction of the block body 3, the load ball paths 31 and the ball return paths 32 formed through the block body 3 are coupled to each other with the direction turning paths 44 formed of the ball guide members 7 and the lid members 4. In this way, the endless circulation paths for the balls 5 are provided in the moving block 2.

In the endless circulation path formed through the moving block 2, after the balls 5 finish rolling under load in the load ball path 31 along with movement of the moving block 2 along the longitudinal direction of the raceway rail 1, the balls 5 are released from the load and enter the direction turning path 44 of one of the lid members 4. Then, the balls 5 roll under a load-free state in the ball return path 32 of the block body 3 toward a direction opposite to a rolling direction in the load ball path 31. Meanwhile, after the balls 5 finish rolling in the ball return path 32, the balls 5 re-enter between the raceway rail 1 and the block body 3 through the direction turning path 44 of another of the lid members 4. Then, the balls 5 roll under load in the load ball path 31.

Figure 5:
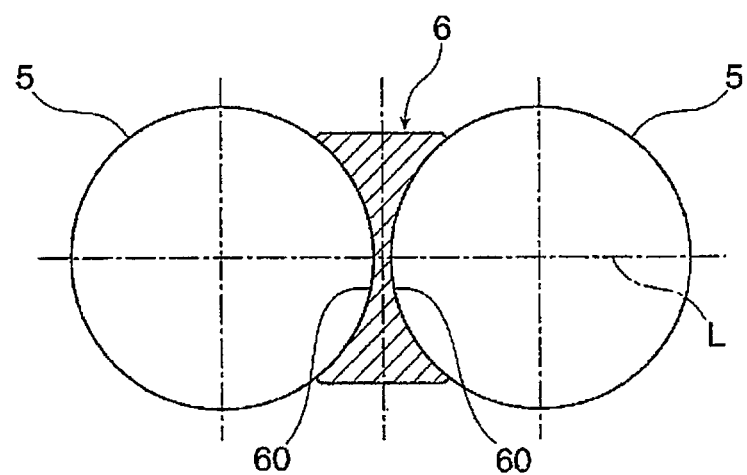
[FIG. 5] A sectional view of a spacer to be incorporated in the motion guide device illustrated in FIG. 1.

The motion guide device according to this embodiment, which includes the endless circulation path described above for the balls 5, as illustrated in FIG. 5, includes a spacer 6 interposed between adjacent ones of the balls 5 incorporated in the endless circulation path of the moving block 2 so as to prevent the balls from coming into contact with each other.

The spacer 6 is obtained by forming a synthetic resin into a substantially disk shape, and includes ball holding seats 60 as spherical seats which are formed respectively at both ends in the rolling direction of the balls 5 and with which the balls 5 are held in sliding contact. The spacer 6 is arranged between adjacent ones of the balls 5 in a manner that a straight line L connecting center points of the balls 5 adjacent to each other and an axial line of the spacer 6 correspond to each other.

The ball holding seats 60 are each formed into a recessed spherical shape substantially in conformity with a spherical surface of the balls 5 so that adjacent ones of the balls 5 is held in contact with the ball holding seat 60 with substantially no gaps therebetween. In other words, when the ball 5 is arranged between a pair of the spacers 6 positioned on the left and right of the ball 5, the ball holding seats 60 of the spacers 6 embrace the ball 5. With this, when the balls 5 and the spacers 6 are arrayed without gaps in the endless circulation path of the motion guide device, the balls 5 do not unstably rock on the ball holding seats 60 of the spacers 6, and the balls 5 and the spacers 6 can be circulated without being meandered in the endless circulation path.

The spacers 6 structured as described above and the balls 5 are arrayed alternately in the endless circulation path. With this, the balls 5 rolling in the endless circulation path are prevented from coming into contact with each other, and the balls 5 are smoothly circulated. As a result, a rotational movement of the moving block 2 with respect to the raceway rail 1 can be smoothly performed. In addition, generation of collision noise of the balls 5 during operation of the motion guide device can be suppressed.

In the motion guide device according to this embodiment, which is structured as described above, as illustrated in FIG. 6, the direction turning paths 44 formed through each of the lid members 4 each include a turning portion 44a for continuously varying the rolling direction of the balls 5, and a preliminary turning portion 44b for coupling the ball return path 32 formed through the block body 3 and the turning portion 44a to each other. In other words, the lid members 4 of the motion guide device according to this embodiment each correspond to a turning path forming member of the present invention. Further, an outer peripheral curved surface of the turning portion 44a is formed into a circular-arc curved surface having a uniform curvature. Meanwhile, an outer surface of the preliminary turning portion 44b is formed into a linear shape so as to be continuous with the ball return path 32. In other words, the outer peripheral side guide surfaces 41 of the direction turning paths 44 are each formed into a compound surface including a curved surface portion and a linear portion.

In the turning portion 44a of the direction turning path 44 formed of the lid member 4 and the ball guide member 7, the balls 5 having rolled in the load ball path 31 formed through the block body 3 roll in a single circular-arc form along the outer peripheral curved surface thereof. Then, the balls 5 roll into the ball return path 32 through the preliminary turning portion 44b. The pair of spacers 6 embraces the ball 5 through intermediation of the ball holding seats 60, and the spacer 6 is arranged between adjacent ones of the balls 5 in the manner that the straight line connecting the center points of the adjacent balls 5 to each other and the axial line thereof correspond to each other.

Thus, in an entry zone A of the direction turning path 44 continuous with the load ball path 31, at the same time when the balls 5 having rolled in the load ball path 31 pass through a start point S of the turning portion 44a and start to roll along the outer peripheral curved surface of the turning portion 44a toward a direction of being spaced apart from the ball rolling surface 11 of the raceway rail 1, the spacers 6 held in contact with the balls 5 from behind also start to move toward the direction of being spaced apart from the ball rolling surface 11 of the raceway rail 1. In other words, the spacers 6 are displaced to gradually come closer to the inner peripheral side guide curved surface 71 of the ball guide member 7 before reaching the start point S of the turning portion 44a. The displacement of the spacers 6 in the direction turning path 44 occurs also in a leading zone C of the direction turning path 44 continuous with the ball return path 32 of the moving block 2.

Meanwhile, in a guide zone B provided between the entry zone A and the leading zone C of the direction turning path 44 and arranged at a center of the direction turning path 44, the balls 5 and the spacers 6 are maintained in a uniform contact state. Thus, the spacers 6 do not come any closer to the inner peripheral side guide curved surface 71, and are moved at a fixed clearance with respect to the inner peripheral side guide curved surface 71.

In this way, a track of the spacers 6 in the direction turning path 44 is not a single circular-arc form unlike a rolling track of the balls 5 in the direction turning path 44, and varies over the entry zone A, the guide zone B, and the leading zone C of the direction turning path 44.

Thus, when the inner peripheral side guide curved surface 71 of the direction turning path 44 is formed into the compound surface similar to the outer peripheral side guide surface 41, the spacers 6 and the inner peripheral side guide curved surface 71 may interfere with each other due to the displacement of the spacers 6 in the direction turning path 44.

However, in the motion guide device according to this embodiment, in consideration of the displacement of the spacers 6 in the entry zone A and the leading zone C of the direction turning path 44, the inner peripheral side guide curved surface 71 provided to the ball guide member 7 includes regions 71a, 71b, and 71c of three types, which have different curvatures, so as to prevent the inner peripheral side guide curved surface 71 and the spacers 6 from interfering with each other. In other words, while the outer surface of the preliminary turning portion 44b of the direction turning path 44 is formed into a linear shape along the rolling direction of the balls 5, an inner peripheral surface thereof is formed into a curved shape. Thus, while the balls 5 are guided linearly in the preliminary turning portion 44b, the spacers 6 are allowed to move in the curved form.

Specifically, in the guide zone B of the direction turning path 44, as described above, the spacers 6 do not come any closer to the inner peripheral side guide curved surface 71 of the ball guide member 7. Thus, the inner peripheral side guide curved surface 71b in the guide zone B is formed into a circular-arc curved surface which is concentric with the outer peripheral curved surface of the turning portion 44a of the direction turning path 44 and has a uniform curvature. Meanwhile, in the entry zone A and the leading zone C of the direction turning path 44, the inner peripheral side guide curved surfaces 71a and 71c are formed with curvatures in conformity with the displacement of the spacers 6. In other words, curvature radii of the inner peripheral side guide curved surfaces 71a and 71c in the entry zone A and the leading zone C are set to be larger than a curvature radius of the inner peripheral side guide curved surface 71b in the guide zone B. Note that, in FIG. 6, for the sake of ease of understanding of the track of the spacers 6 in the direction turning path 44, the balls 5 inside the direction turning path 44 are indicated by dashed lines.

While the leading zone C of the direction turning path 44 is continuous with the ball return path 32 having the inner diameter slightly larger than the ball diameter, the entry zone A is continuous with the load ball path 31 having an inner diameter substantially equal to the ball diameter. In other words, the inner diameter of the direction turning path 44 in the entry zone A is slightly smaller than that in the leading zone C. Thus, correspondingly thereto, it is preferred that the curvature radius of the inner peripheral side guide curved surface 71a in the entry zone Abe set to be smaller than the curvature radius of the inner peripheral side guide curved surface 71c in the leading zone C.

As described above, in the entry zone A and the leading zone C of the direction turning path 44, the spacers 6 gradually come closer to the inner peripheral side guide curved surface 71 of the ball guide member 7 before reaching the start point S and a start point S' of the turning portion 44a of the direction turning path 44. In the motion guide device according to this embodiment, start points P and Q of the inner peripheral side guide curved surfaces 71a and 71c in the entry zone A and the leading zone C of the direction turning path 44 are displaced toward the load ball path 31 and the ball return path 32 with respect to the start points S and S' of the turning portion 44a. Note that, the outer peripheral curved surface of the turning portion 44a of the direction turning path 44 is formed into the circular-arc curved surface having a uniform curvature, and hence, in FIG. 6, the start point S on the load ball path 31 side is illustrated at a position of facing the start point S' on the ball return path 32 side with respect to a moving direction of the moving block 2.

According to the motion guide device of this embodiment, which is structured as descried above, the direction turning paths formed through each of the lid members 4 each include the preliminary turning portion 44b for coupling the ball return path 32 and the turning portion 44a to each other. The outer surface of the preliminary turning portion 44b is formed into the linear shape so as to be continuous with the outer peripheral side guide surface 41. Meanwhile, the inner peripheral surface thereof, in other words, the inner peripheral side guide curved surface 71c in the leading zone C of the direction turning path 44 is formed into a curved surface shape. As a result, while the balls 5 are guided linearly in the preliminary turning portion 44b, the spacers 6 are allowed to move in the curved form.

Thus, at the same time when the balls 5 having rolled in the load ball path 31 or the ball return path 32 pass through the start point S or S' of the turning portion 44a for turning the rolling direction of the balls 5, the spacers 6 held in contact with the balls 5 from behind pass through the start point P of the inner peripheral side guide curved surface 71a in the entry zone A and the start point Q of the inner peripheral side guide curved surface 71c in the leading zone C.

Therefore, even when the spacers 6 gradually come closer to the inner peripheral side guide curved surface 71 of the direction turning path 44 at the same time when the balls 5 having rolled in the load ball path 31 or the ball return path 32 pass through the start point S or S' of the turning portion 44a and roll along the outer peripheral curved surface of the turning portion 44a toward the direction of being spaced apart from or coming closer to the ball rolling surface 11 of the raceway rail 1, the inner peripheral side guide curved surfaces 71a and 71c and the spacers 6 are prevented from interfering with each other. This is because the inner peripheral side guide curved surface 71a in the entry zone A or the inner peripheral side guide curved surface 71c in the leading zone C in the direction turning path 44 are formed with the curvatures in conformity with the displacement of the spacers 6 in the direction turning path 44. As a result, the rolling elements can be smoothly circulated in the endless circulation path formed through the moving block.

Figure 6:
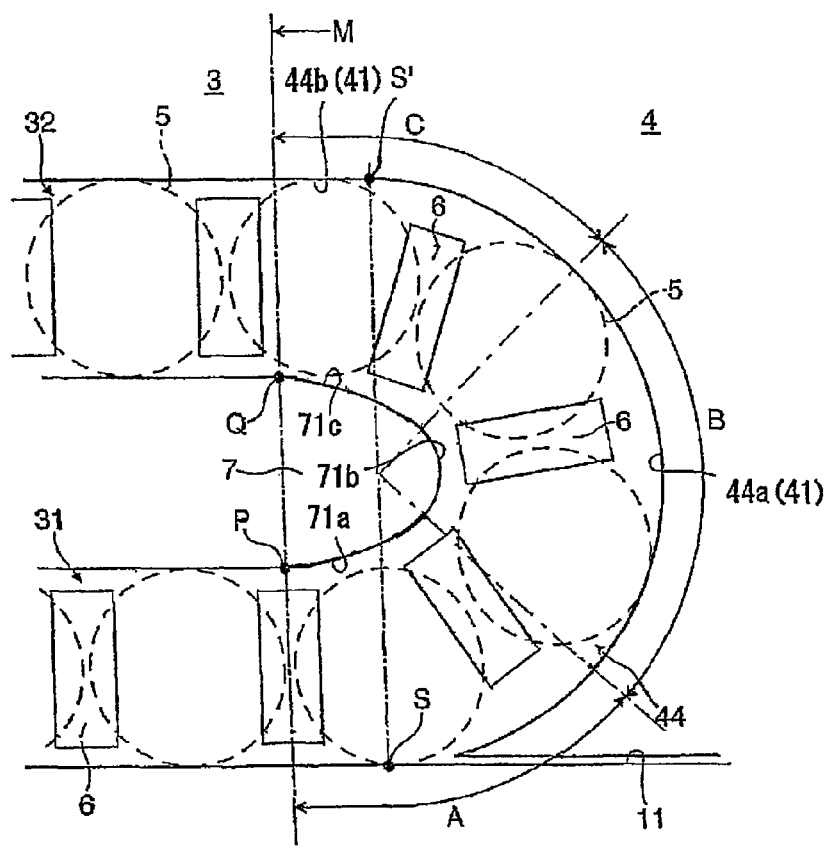
[FIG. 6] An enlarged view of a direction turning path provided in the motion guide device illustrated in FIG. 1.

When a parting plane of the block body 3 and the lid member 4 is designed in alignment with the start points S and S' of the turning portion 44a of the direction turning path 44, the start point P of the inner peripheral side guide curved surface 71a, and the start point Q of the inner peripheral side guide curved surface 71c, the structures of the end surfaces of the block body 3 and the lid member 4 are complicated. However, according to the motion guide device of this embodiment, as illustrated in FIG. 6, a parting plane M of the block body 3 and the lid member 4 matches with a plane including the start point P of the inner peripheral side guide curved surface 71a and the start point Q of the inner peripheral side guide curved surface 71c. Further, the ball guide member 7 forming the inner peripheral side guide curved surface 71 of the direction turning path 44 is provided independently from the lid member 4 and the block body 3. With this, all curved surface parts of the inner peripheral side guide curved surface 71 are accommodated in the lid member 4, and hence the structures of the end surfaces of the block body 3 and the lid member 4 can be simplified.

Figure 7:
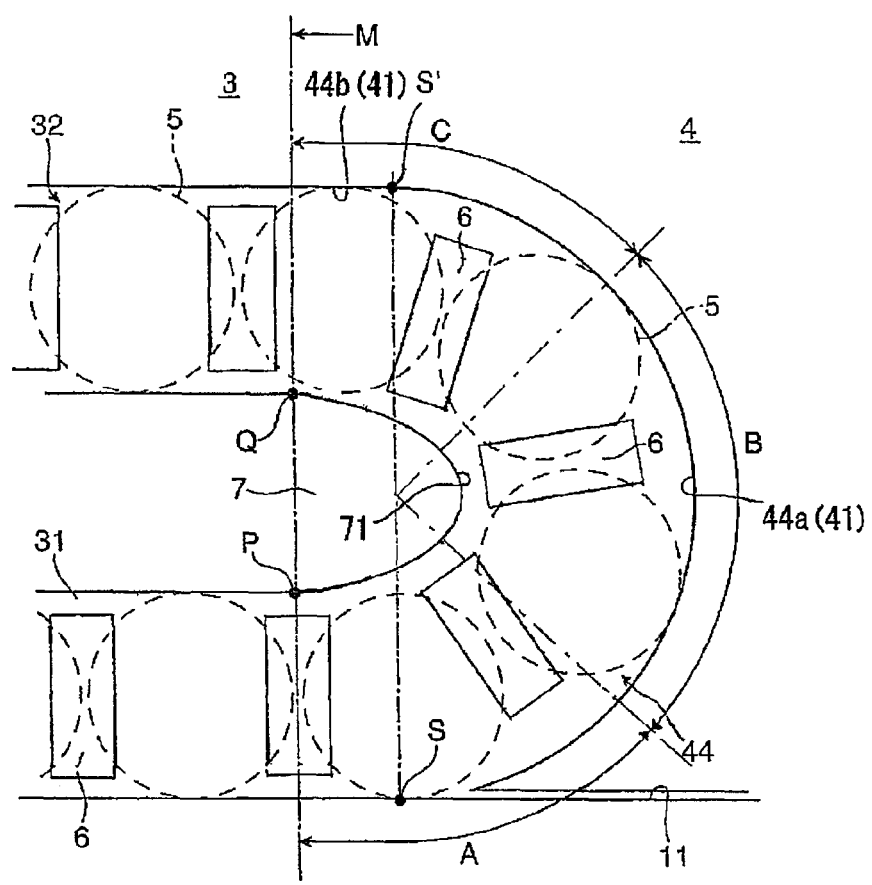
[FIG. 7] An enlarged view illustrating a second embodiment of the ball guide member of the direction turning path.

FIG. 7 is an enlarged view illustrating a second embodiment of the ball guide member 7. As long as the inner peripheral side guide curved surface 71 provided to the ball guide member 7 and the spacers 6 can be prevented from interfering with each other, the shape of the inner peripheral side guide curved surface 71 may be replaced with an elliptical shape close to a compound curved surface including the circular arcs 71a, 71b, and 71c of the three types described above. With such a structure, the inner peripheral side guide curved surface 71 can be more simply formed, and hence the motion guide device can be more simply produced.

Note that, in the embodiment illustrated in FIG. 6, the inner peripheral side guide curved surface 71 includes the compound curved surface including the circular arcs 71a, 71b, and 71c of the three types, but the shape of the inner peripheral side guide curved surface 71 is not limited thereto. For example, as long as the inner peripheral side guide curved surface 71 and the spacers 6 can be prevented from interfering with each other, the inner peripheral side guide curved surface 71 may be formed into a compound curved surface including circular arcs of four or more types, or a compound curved surface obtained from a specific formula, such as a clothoid curve.

Further, in the example described above in this embodiment, the balls are used as rolling elements, but the rolling elements are not limited to the balls, and rollers may be used. In that case, in conformity with the shape of the rollers to be used, the rolling surface for the rolling elements may be formed into a curved surface shape in cross-section as in the case of the balls, or a merely planar shape.

In the example described above in this embodiment, in order to prevent the spacers and the inner peripheral side guide curved surface of the direction turning path from interfering with each other due to the displacement of the spacers at the time of entry of the balls into the direction turning path, the present invention is applied to the inner peripheral side guide curved surface of the direction turning path. However, the present invention is applicable also to a motion guide device in which the endless circulation path of the moving block 2 incorporates a coupler belt in which the plurality of spacers are coupled to each other by belt members. As for the motion guide device of this type, the present invention is applicable to guide grooves for guiding the belt members along a circulating direction of the balls, which are provided in an inner wall of the endless circulation path. With this, the belt members for coupling the plurality of spacers to each other and the guide groove are prevented from interfering with each other due to the displacement of the track of the spacers.

Figure 8:
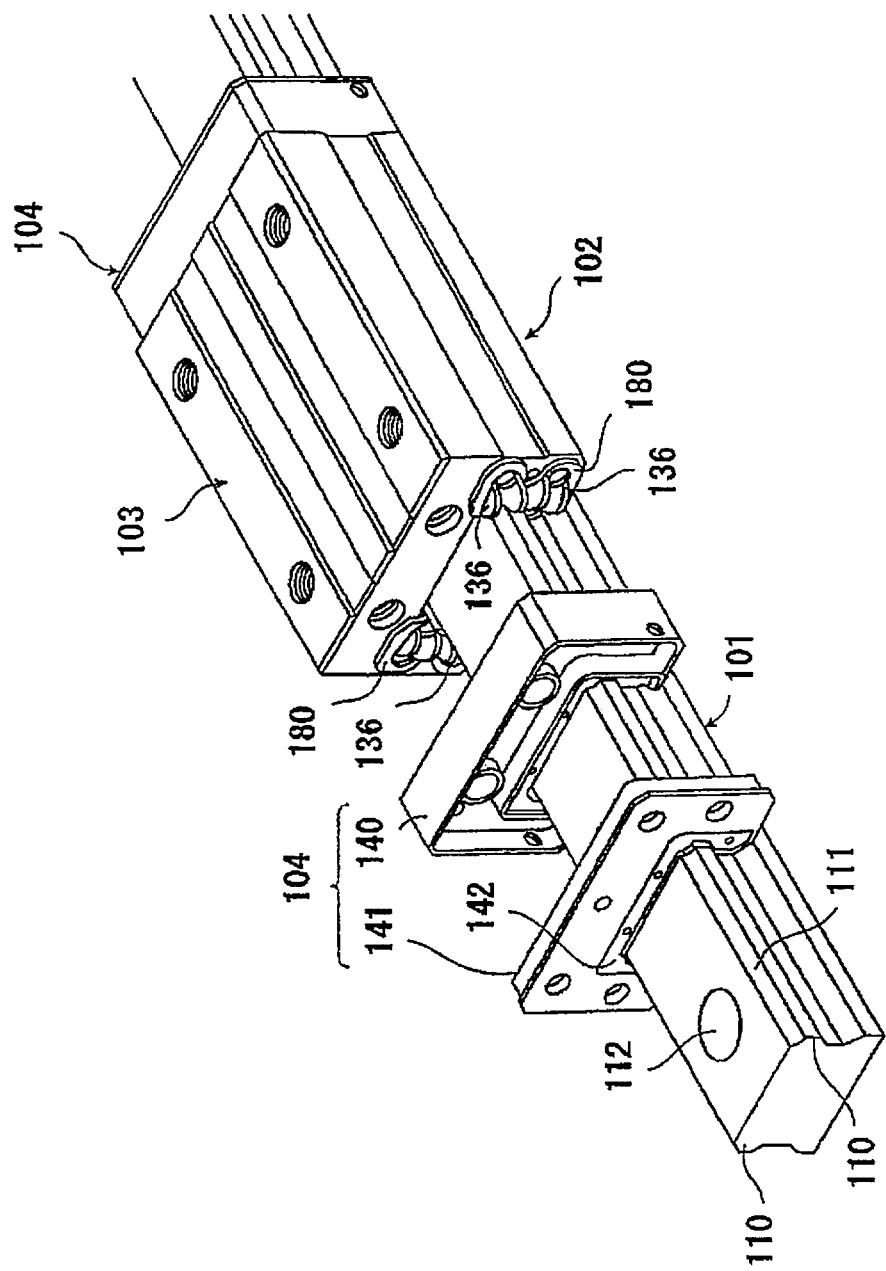
[FIG. 8] A perspective view of a motion guide device according to a second embodiment of the present invention.

FIG. 8 illustrates a motion guide device according to a second embodiment of the present invention. The motion guide device includes a linearly extending raceway rail 101, and a moving block 102 assembled to the raceway rail 101 through intermediation of a large number of balls as the rolling elements. The raceway rail 101 is set to the fixation portion, and various objects are mounted to the moving block 102. With this, the objects can be guided reciprocably along the raceway rail 101.

The raceway rail 101 is formed into an elongated shape substantially quadrangular in cross-section. The raceway rail 101 includes bolt mounting holes 120 formed thereon, which pass therethrough from the upper surface to the bottom surface at predetermined intervals along the longitudinal direction. The raceway rail 101 can be firmly fixed to the fixation portion such as a bed and a column with fixing bolts inserted in the bolt mounting holes 120. Projecting portions 110 are provided respectively on both lateral side surfaces of the raceway rail 101 along the longitudinal direction. One ball rolling surface 111 is provided on each vertical side of each of the projecting portions 110. The raceway rail includes a total of four ball rolling surfaces 111.

Meanwhile, the moving block 102 basically includes a block assembly 103, and a pair of lid members 104 mounted to both ends in a reciprocating direction of the block assembly 103. The lid members 104 each include a lid body 140 and a seal retaining plate 141 fixed thereto. A sealing member 142 is mounted to each of the seal retaining plates 141, and the sealing member 142 seals off a gap between the lid member 104 and the raceway rail 101. With this, dust and the like, which adhere to the raceway rail 101, are prevented from intruding into an inside of the moving block 102. Note that, FIG. 8 illustrates a state in which one of the lid members 104 is removed from the block assembly 103 and the lid member 104 is separated into the lid body 140 and the seal retaining plate 141.

Figure 9:
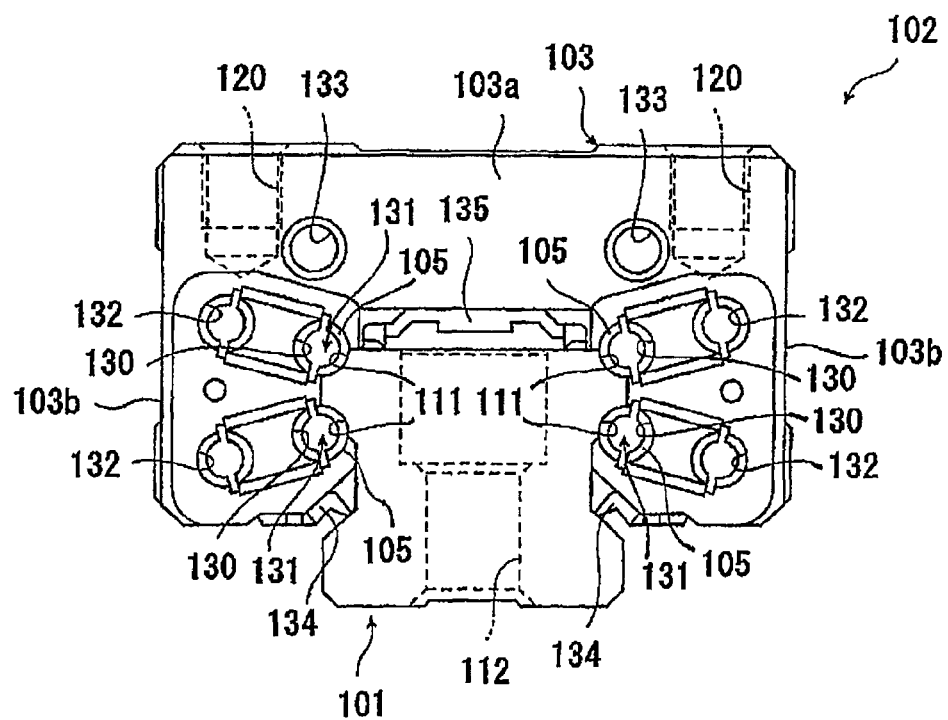
[FIG. 9] A front view in which the lid member is removed from the motion guide device illustrated in FIG. 8.

FIG. 9 is a front view in which the lid member 104 is removed from the motion guide device. The block assembly 103 is formed into a substantially channel shape including a horizontal portion 103a facing the upper surface of the raceway rail 101 and a pair of skirt portions 103b facing both side surfaces of the raceway rail 101. An upper half of the raceway rail 101 is accommodated between the pair of skirt portions 103b. As illustrated in FIG. 8, the lid members 104 are formed into substantially the same shape as that of the block assembly 103 so as to be mounted to the end portions of the block assembly 103. Further, the horizontal portion 103a of the block assembly 103 includes tapped holes 120 for allowing the objects to be fixed with bolts.

As illustrated in FIG. 9, on an inside of the skirt portions 103b, which face the raceway rail 101, load ball rolling surfaces 130 for the balls 105 are provided to face the ball rolling surfaces 111 of the raceway rail 101. The load ball rolling surfaces 130 and the ball rolling surfaces 111 of the raceway rail 101, which face each other, form load ball paths 131 in which the balls 105 roll under load between the raceway rail 101 and the moving block 102. The loadball rolling surfaces 130 include two loadball rolling surfaces 130 provided on an inner side surface of each of the skirt portions 103b, and the load ball paths 131 include four load ball paths 131 provided to the block assembly 103. Further, the skirt portions 103b each include ball return paths 132 corresponding to and substantially parallel to the load ball paths 131. With this, balls 105 roll under a load-free state in the ball return paths 132.

Further, the pair of lid members 104 fixed to both end surfaces of the block assembly 103 each include direction turning paths coupling the load ball paths 131 and the ball return paths 132 to each other. With this, the balls 105 can be intercommunicated between the load ball path 131 and the ball return path 132. Note that, in FIG. 9, reference numerals 133 represent tapped holes used for fixation of the lid member 104, reference numerals 134 represent sealing members for sealing off the gaps between the side surfaces of the raceway rail 101 and the skirt portions 103b of the block assembly 103, and reference numeral 135 represents a sealing member for sealing off the gap between the upper surface of the raceway rail 101 and the horizontal portion 103a of the block assembly 103.

Figure 10:
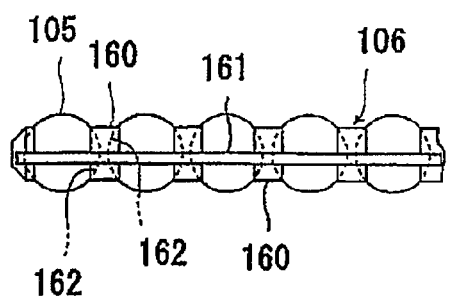
[FIG. 10] A side view of a coupler belt to be incorporated in the motion guide device illustrated in FIG. 8.
Figure 11:
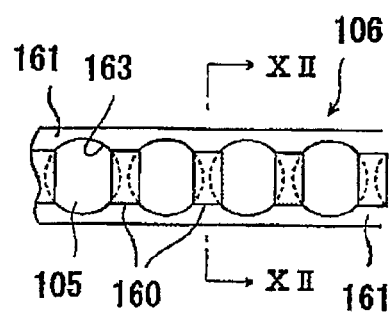
[FIG. 11] A plan view of the coupler belt illustrated in FIG. 10.
Figure 12:
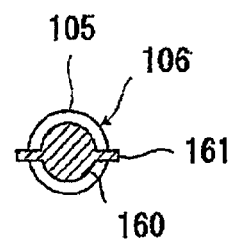
[FIG. 12] A sectional view taken along the line XII-XII of FIG. 11.

Under a state of being arrayed through a flexible coupler belt 106, the balls 105 are incorporated in the endless circulation path of the moving block 102. FIGS. 10, 11, and 12 illustrate the balls 105 and the coupler belt 106. The coupler belt 106 is produced through injection molding of a synthetic resin, and includes a plurality of spacers 160 arranged between the balls 105, and a pair of belt members 161 for coupling the spacers 160 to each other. The spacer 160 is arranged between adjacent ones of the balls 105 in a manner that a straight line connecting center points of the adjacent balls 105 to each other and an axial line of the spacer 106 correspond to each other, and has contact surfaces with respect to the balls 105, each provided with a spherical seat 162 having a curvature approximate to that of a spherical surface of the balls 105. In other words, when the ball 105 is arranged between a pair of the spacers 160 positioned on the left and right of the ball 105, the ball 105 is embraced by the spherical seats 162 of the spacers 160.

Meanwhile, the pair of belt members 161 are coupled to each other on side surfaces in a circumferential direction of the spacers 160 interposed between the balls 105 arrayed in a line, and couple the spacers 160 to each other in a line. As illustrated in FIG. 11, the belt members 161 are each formed, for example, into a flat band shape, and include circular-arc cutout portions 163 for avoiding interference with the balls 105 between the spacers 160 adjacent to each other. With such a structure, the balls 105 can be held in a rotatable state at equal intervals in a line with respect to the coupler belt 106. Thus, when the moving block 102 is moved along the raceway rail 101, the balls 105 roll in the endless circulation path while rolling by themselves. Along therewith, the coupler belt 106 circulates in the endless circulation path.

Figure 13:
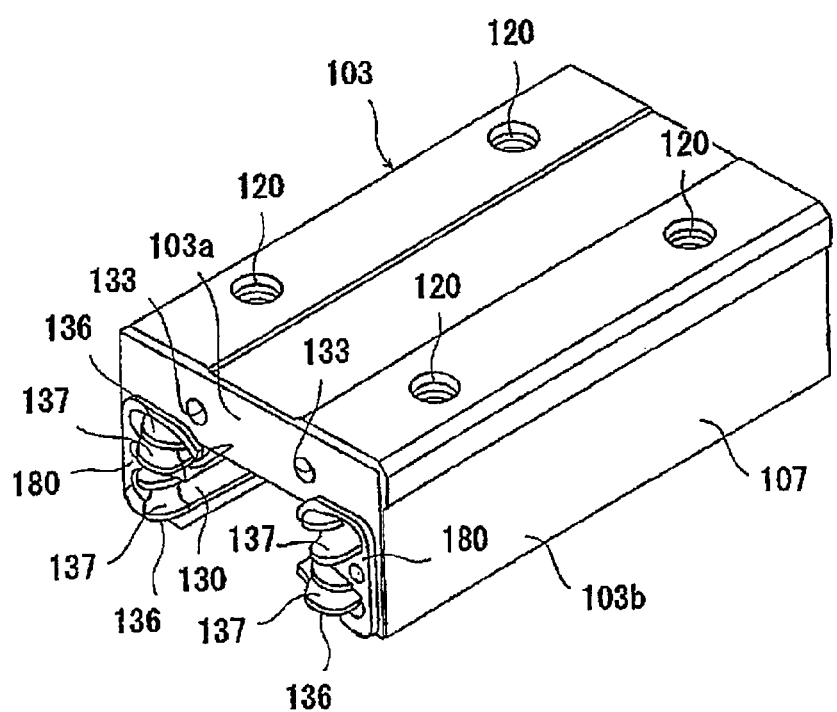
[FIG. 13] A perspective view of a block assembly of the motion guide device illustrated in FIG. 8.

FIG. 13 is a perspective view of the block assembly 103. The end surfaces of the block assembly 103 are each provided with a plurality of inner peripheral guide portions 136 for guiding the balls 105 in the direction turning paths for the balls 105 cooperatively with the lid member 104. The inner peripheral guide portions 136 are provided between the load ball paths 131 and the ball return paths 132 corresponding thereto in a manner of projecting in a semicircular shape from the end surfaces of the block assembly 103. Further, the inner peripheral guide portions 136 each have an outer peripheral surface provided with an inner peripheral side guide curved surface 137 on which the balls 105 roll. The inner peripheral side guide curved surface 137 has one end continuous with the load ball rolling surface 130 and another end continuous with the ball return path 132.

Figure 14:
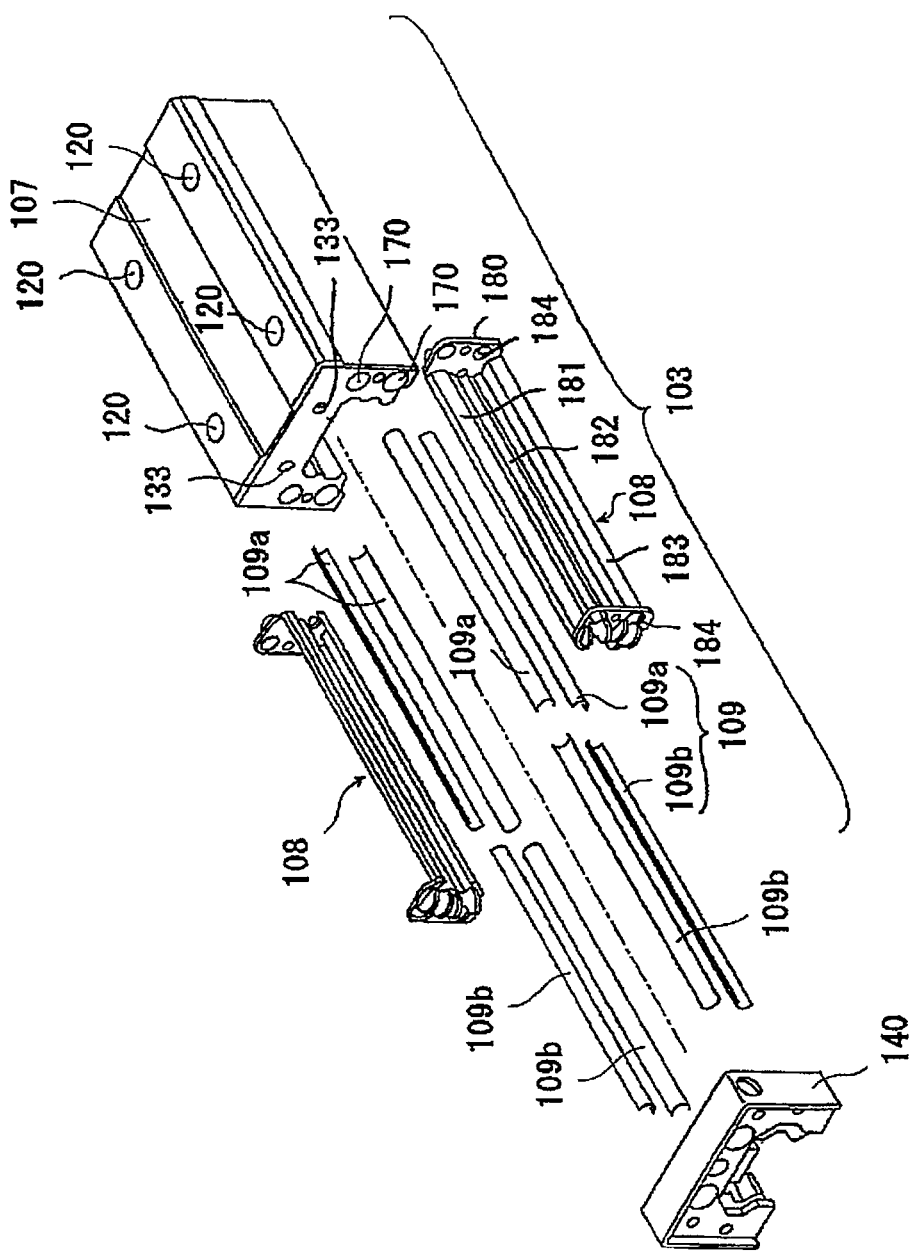
[FIG. 14] An exploded perspective view of the block assembly illustrated in FIG. 13.

FIG. 14 is an exploded perspective view of a structure of the block assembly 103. The block assembly 103 includes a metal block body 107 provided with the load ball rolling surfaces 130, a pair of circulating members 108 mounted to the block body 107 so as to serve as a part of the skirt portions 103b of the block assembly 103, and four pipe members 109 inserted into mounting holes 170 formed through the block body 107 so as to serve as the ball return paths 132. The circulating members 108 and the pipe members 109 are each made of a synthetic resin.

The pipe member 109 is formed through combination of a first half pipe 109a and a second half pipe 109b each having a substantially semicircular shape in cross-section perpendicular to a longitudinal direction of the pipe member. The first half pipe 109a and the second half pipe 109b are fitted against each other and inserted in the mounting holes 170 of the block body 107. Although not shown in FIG. 14, the pipe members 109 each have an inner wall including two guide grooves for accommodating the belt members 161 of the coupler belt 106, which are formed along the longitudinal direction at positions facing each other.

Meanwhile, the circulating members 108 each include a pair of flange portions 180 corresponding respectively to both end surfaces of the block body 107, and three holding frames 181, 182, and 183 for coupling the flange portions 180 to each other. The flange portions 180 are each formed into a flat plate shape to cover a part of the end surfaces of the block body 107, and include pipe holding holes 184 provided at positions corresponding to end portions of the pipe members 109. The pipe holding holes 184 each serve as inlets or outlets of the ball return paths 132 provided through the block body 107. Further, the flange portions 180 include the inner peripheral guide portions 136 described above, which are provided adjacent to the pipe holding holes 184.

The first holding frame 181 is provided along an upper edge of an upper one of the two load ball rolling surfaces 130 provided to each of the skirt portions 103b. Meanwhile, the second holding frame 182 is provided between the two load ball rolling surfaces 130. Further, at a lower end of each of the skirt portions 103b, the third holding frame 183 is provided along a lower edge of a lower one of the load ball rolling surfaces 130. In addition, along edge portions of the holding frames 181, 182, and 183, which face the load ball rolling surfaces 130, there are provided guide grooves for accommodating the belt members 161 of the coupler belt 106.

As illustrated in FIG. 13, such circulating members 108 are mounted from inside to the skirt portions 103b of the block assembly 103, and arranged in a manner that the pair of flange portions 180 coupled to each other with the three holding frames 181, 182, and 183 sandwich the block body 107. At this time, the three holding frames 181, 182, and 183 are arranged to surround the two load ball rolling surfaces 130 provided to the block body 107. With this, the guide grooves are positioned on both sides of the load ball rolling surfaces 130, and serve as paths for the belt members 161 of the coupler belt 106.

Under the state in which the pipe members 109 are inserted in the mounting holes 170 of the block body 107, end portions of the first half pipe 109a each project from the mounting holes 170 by an amount corresponding to a thickness of the flange portion 180, and the end portions of the first half pipe 109a are each fitted to the pipe holding hole 184 in a manner of abutting against inner peripheral side belt guide walls 138 of the inner peripheral guide portion 136. Meanwhile, end surfaces of the second half pipe 109b are each held in abutment against a back side of the flange portion 180.

Figure 15:
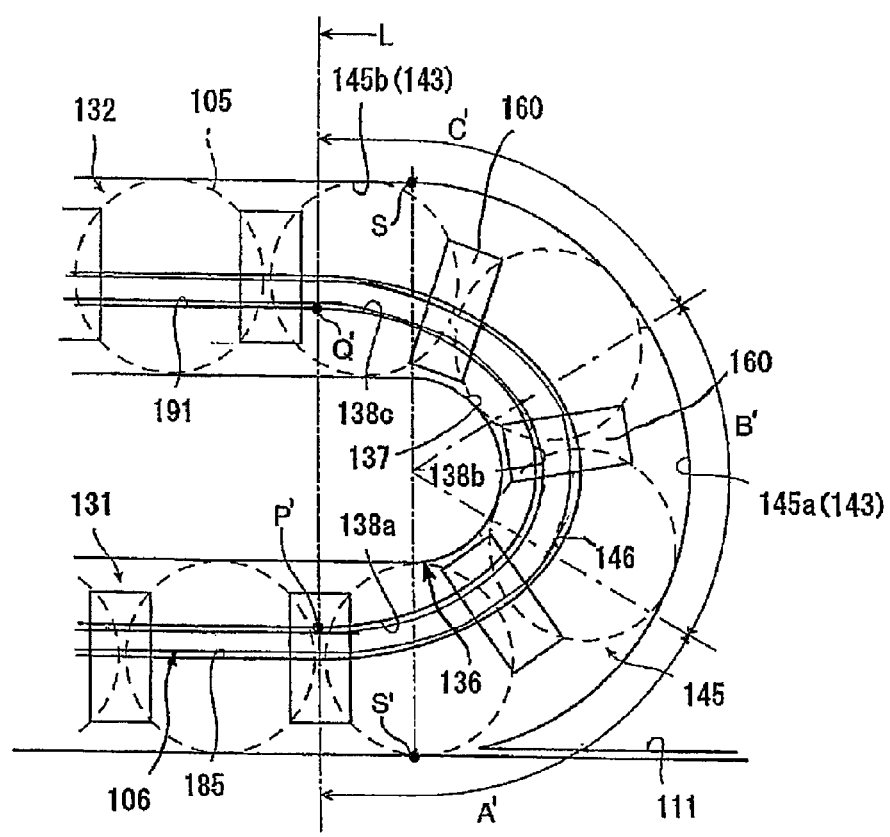
[FIG. 15] A layout view of a guide groove formed in the direction turning path.

Further, the lid body 140 of each of the lid members 104 includes an outer peripheral guide groove to which the inner peripheral guide portion 136 is fitted as illustrated in FIG. 15. The outer peripheral guide groove is formed into a semicircular shape having a radius larger than that of the inner peripheral guide portion 136. The outer peripheral guide groove has an outer peripheral side guide surface 143 facing the inner peripheral side guide curved surface 137 of the inner peripheral guide portion 136.

Thus, when the lid member 104 is mounted to the block assembly 103, the inner peripheral side guide curved surface 137 of the inner peripheral guide portion 136 and the outer peripheral side guide surface 143 of the outer peripheral guide groove are combined with each other. In this way, a direction turning path 145 having an inner diameter slightly larger than a diameter of the balls 105 is completed therebetween. Further, when the outer peripheral guide groove and the inner peripheral guide portion 136 are combined with each other, guide grooves 146 for accommodating the belt members 161 of the coupler belt 106 are provided to the direction turning path 145. The guide grooves 146 face the inner peripheral side belt guide walls 138 provided on both sides of the inner peripheral side guide curved surface 137 of the inner peripheral guide portion 136.

In this way, the inner peripheral side belt guide walls 138 face the guide grooves 146 in the direction turning path 145. Thus, when the end portion of the first half pipe 109*a* abuts against the inner peripheral side belt guide walls 138 inside the pipe holding hole 184, guide grooves 191 provided by the pipe member 109 in the ball return path 132 are coupled accurately to the guide grooves 146 provided in the direction turning path.

Further, when the lid member 104 is mounted to the block assembly 103, the guide grooves 185 provided along the edge portions of the holding frames 181, 182, and 183 are coupled accurately to the guide grooves 146 provided in the direction turning path. In other words, when the lid member 104 is mounted to the block assembly 103, the guide grooves 185 provided in the load ball rolling surface 130, the guide grooves 146 provided in the direction turning path 145, and the guide groove 191 of the ball return path 132 are coupled to each other. In this way, guide grooves to which the belt members 161 of the coupler belt 106 are fitted are completed in the endless circulation path for the balls 105.

In the motion guide device according to the present invention, which is structured as described above, as illustrated in FIG. 15, the direction turning paths 145 formed through each of the lid members 104 each include a turning portion 145*a* for continuously varying the rolling direction of the balls 105, and a preliminary turning portion 145*b* for coupling the turning portion 145*a* and the ball return path 132 to each other. Further, an outer peripheral curved surface of the turning portion 145*a* is formed into a circular-arc curved surface having a uniform curvature. Meanwhile, an outer surface of the preliminary turning portion 145*b* is formed into a linear shape so as to be continuous with the ball return path 132. In other words, the outer peripheral side guide surfaces 143 of the direction turning paths 145 are each formed into a compound surface including a curved surface portion and a linear portion.

In this embodiment, the flange portions 180 of the circulating members 108 are each formed into a flat plate shape to cover a part of the end surfaces of the block body 107. Thus, actually, while the turning portion 145*a* of the direction turning path 145 is formed in the lid member 104, the preliminary turning portion 145*b* of the direction turning path 145 is provided to each of the flange portions 180. In other words, the lid members 104 and the circulating members 108 according to this embodiment each correspond to the turning path forming member of the present invention.

In the turning portion 145*a* of the direction turning path 145, the balls 105 having rolled in the load ball path 131 formed through the block assembly 103 roll in a single circular-arc form along the outer peripheral curved surface of the turning portion 145*a*. Then, the balls 5 roll into the ball return path 132 through the preliminary turning portion 145*b*. The pair of spacers 160 embraces the ball 105 through intermediation of the spherical seats 162, and the spacer 160 is arranged between adjacent ones of the balls 105 in the manner that the straight line connecting the center points of the adjacent balls 105 to each other and the axial line thereof correspond to each other.

Thus, in an entry zone A' of the direction turning path 145 continuous with the load ball path 131, at the same time when the balls 105 having rolled in the load ball path 131 pass through a start point S' of the turning portion 145*a* and start to roll along the outer peripheral curved surface of the turning portion 145*a* toward a direction of being spaced apart from the ball rolling surface 111 of the raceway rail 101, the spacers 160 held in contact with the balls 105 from behind also start to move toward the direction of being spaced apart from the ball rolling surface 111 of the raceway rail 101. In other words, the spacers 160 are displaced to gradually come closer to the inner peripheral side guide curved surface 137 of the direction turning path 145 before reaching the start point S' of the turning portion 145*a*. The displacement of the spacers 160 in the direction turning path 145 occurs also in a leading zone C' of the direction turning path 145 continuous with the ball return path 132 of the moving block 102.

Meanwhile, in a guide zone B' provided between the entry zone A' and the leading zone C' of the direction turning path 145 and arranged at a center of the direction turning path 145, the balls 105 and the spacers 160 are maintained in a uniform contact state. Thus, the spacers 160 do not come any closer to the inner peripheral side guide curved surface 137, and are moved at a fixed clearance with respect to the inner peripheral side guide curved surface 137.

In this way, a track of the spacers 160 in the direction turning path 145 is not a single circular-arc form unlike a rolling track of the balls 105 in the direction turning path 145, and varies over the entry zone A', the guide zone B', and the leading zone C' of the direction turning path 145.

By the way, the belt members 161 of the coupler belt 106 are provided to couple the spacers 160 to each other in a line, and hence the belt members 161 move in the endless circulation path for the balls 105 in a manner of following the movement of the spacers 160. Thus, in the entry zone A' and the leading zone C' of the direction turning path 145, the belt members 161 also gradually come closer to the inner peripheral side guide curved surface 137 of the direction turning path 145 together with the spacers 160.

When the inner peripheral side belt guide walls 138 of the guide grooves 146 in the direction turning path 145 are each formed into a compound curved surface similar to the outer peripheral side guide surface 143, the belt members 161 interfere with the inner peripheral side belt guide walls 138 of the guide grooves 146 along with the displacement of the spacers 160 in the direction turning path 145.

However, in the motion guide device according to the present invention, in consideration of the displacement of the spacers 160 in the entry zone A' and the leading zone C' of the direction turning path 145, as illustrated in FIG. 15, the inner peripheral side belt guide walls 138 each include regions 138*a*, 138*b*, and 138*c* of three types, which have different curvatures, so that the inner peripheral side belt guide walls 138 and the belt members 161 do not interfere with each other. In other words, while the outer surface of the preliminary turning portion 145*b* of the direction turning path 145 is formed into a linear shape along the rolling direction of the balls 105, the inner peripheral side belt guide walls 138 formed in an inner peripheral wall of the preliminary turning portion 145b are each formed into a curved shape. Thus, while the balls 105 are guided linearly in the preliminary turning portion 145b, the spacers 160 and the belt members 161 which follow the movement of the spacers 160 are allowed to move in the curved form.

Specifically, in the guide zone B' of the direction turning path 145, as described above, the spacers 160 or the belt members 161 do not come any closer to the inner peripheral side guide curved surface 137 of the direction turning path 145. Thus, the inner peripheral side belt guide wall 138b in the guide zone B' is formed into a circular-arc curved surface which is concentric with the outer peripheral curved surface of the turning portion 145a of the direction turning path 145 and has a uniform curvature. Meanwhile, in the entry zone A' and the leading zone C' of the direction turning path 145, the inner peripheral side belt guide walls 138a and 138c of each of the guide grooves 146 are formed with curvatures in conformity with the displacement of the spacers 160. In other words, curvature radii of the inner peripheral side belt guide walls 138a and 138c in the entry zone A' and the leading zone C' are set to be larger than a curvature radius of the inner peripheral side belt guide wall 138b in the guide zone B'. Note that, in FIG. 15, for the sake of ease of understanding of the track of the spacers 160 in the direction turning path 145, the balls 105 inside the direction turning path 145 are indicated by dashed lines.

While the leading zone C' of the direction turning path 145 is continuous with the ball return path 132 having the inner diameter slightly larger than the ball diameter, the entry zone A' is continuous with the load ball path 131 having an inner diameter substantially equal to the ball diameter. In other words, the inner diameter of the direction turning path 145 in the entry zone A' is slightly smaller than that in the leading zone C'. Thus, correspondingly thereto, it is preferred that the curvature radius of the inner peripheral side belt guide wall 138a in the entry zone A' be set to be smaller than the curvature radius of the inner peripheral side belt guide wall 138c in the leading zone C'.

As described above, in the entry zone A' and the leading zone C' of the direction turning path 145, the spacers 160 gradually come closer to the inner peripheral side guide curved surface 137 side of the direction turning path 145 before reaching the start points S and S' of the turning portion 145a. The belt members 161 follow the displacement of the spacers 160 in the endless circulation path for the balls 105. Thus, in the motion guide device according to the present invention, start points P' and Q' of the inner peripheral side belt guide wall 138a and 138c of each of the guide grooves 146 in the entry zone A' and the leading zone C' of the direction turning path 145 are displaced toward the load ball path 131 and the ball return path 132 with respect to the start points S and S' of the turning portion 145a. Note that, the outer peripheral curved surface of the turning portion 145a is formed into the circular-arc curved surface having a uniform curvature, and hence, in FIG. 15, the start point S' on the load ball path 131 side is illustrated at a position of facing the start point S on the ball return path 132 side with respect to a moving direction of the moving block 102.

In the motion guide device of the present invention, which is structured as described above, the direction turning paths 145 formed through each of the lid members 104 each include the preliminary turning portion 145b for coupling the ball return path 132 and the turning portion 145a to each other. The outer peripheral surface of the preliminary turning portion 145b is formed into the linear shape so as to be continuous with the outer peripheral curved surface of the turning portion 145a. Meanwhile, the inner peripheral side belt guide wall 138c formed on an inner wall of the preliminary turning portion 145b is formed into a curved shape. As a result, while the balls 105 are guided linearly in the preliminary turning portion 145b, the spacers 160 and the belt members 161 which follow the movement of the spacers 160 are allowed to move in the curved form.

Thus, even when the spacers 160 gradually come closer to the inner peripheral side guide curved surface 137 side of the direction turning path 145 at the same time when the balls 105 having rolled in the load ball path 131 or the ball return path 132 pass through the start point S or S' of the outer peripheral side guide surface 143 and roll along the outer peripheral side guide surface 143 toward the direction of being spaced apart from or coming closer to the ball rolling surface 111 of the raceway rail 101, the belt members 161 which follow the displacement of the spacers 160 have already passed through the start point P' of the inner peripheral side belt guide wall 138a in the entry zone A' and the start point Q' of the inner peripheral side belt guide wall 138c in the leading zone C'.

Therefore, in the motion guide device according to the present invention, the inner peripheral side belt guide walls 138a or the inner peripheral side belt guide walls 138c, and the belt members 161 in the entry zone A' or the leading zone C' of the direction turning path 145 can be prevented from interfering with each other. As a result, the rolling elements can be smoothly circulated in the endless circulation path formed through the moving block.

When a parting plane of the block assembly 103 and the lid member 104 is designed in alignment with the start points S and S' of the outer peripheral side guide surface 143 of the direction turning path 145, the start point P' of the inner peripheral side belt guide wall 138a, and the start point Q' of the inner peripheral side belt guide wall 138c, curved surface parts of each of the inner peripheral side belt guide walls 138 are accommodated in the block assembly 103. As a result, the structures of the end surfaces of the block assembly 103 and the lid member 104 are complicated. However, according to the motion guide device of this embodiment, as illustrated in FIG. 15, a parting plane L of the block assembly 103 and the lid member 104 matches with a plane including the start point P' of the inner peripheral side belt guide wall 138a and the start point Q' of the inner peripheral side belt guide wall 138c. With this, all the curved surface parts of each of the inner peripheral side belt guide walls 138 are accommodated in the lid member 104, and hence the structures of the end surfaces of the block assembly 103 and the lid member 104 can be simplified.

Meanwhile, in consideration of rolling stability of the balls 105 in the direction turning path 145, it is preferred that the spacers 160 and the spherical seats 162 for embracing the balls 105 be enlarged. In this case, when the inner peripheral side guide curved surface 137 of the direction turning path 145 is formed into the circular-arc curved surface having a uniform curvature, the spacers 160 may gradually come closer to the inner peripheral side guide curved surface 137 side of the direction turning path 145 along with the rolling of the balls 105 in the direction turning path 145. As a result, the inner peripheral side guide curved surface 137 and the spacers 160 may interfere with each other. In view of this, in order to obtain the same advantages also when the spacers 160 are enlarged, similarly to the inner peripheral side belt guide wall 138 of each of the guide grooves 146, the inner peripheral side guide curved surface 137 of the direction turning path 145 needs to be formed into the compound curved surface including circular arcs of three types, which have different curvatures.

Figure 16:
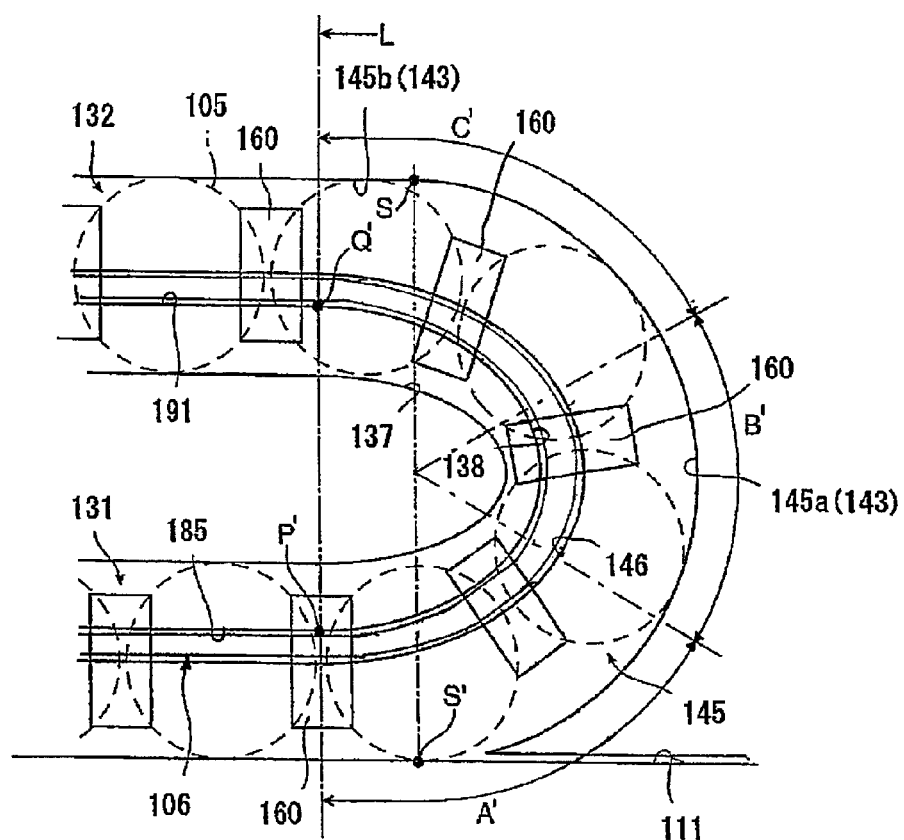
[FIG. 16] A layout view illustrating a second embodiment of the guide groove formed in the direction turning path.

FIG. 16 is an enlarged view illustrating a second embodiment of the guide groove 146 formed in the direction turning path 145. As long as the inner peripheral side belt guide walls 138 and the belt members 161 can be prevented from interfering with each other, the inner peripheral side belt guide walls 138 may be each formed into a shape close to an elliptical shape. With such a structure, the inner peripheral side belt guide walls 138 can be more simply formed, and hence the motion guide device can be more simply produced than in the first embodiment described above.

Further, in the example described in this embodiment, the balls are used as rolling elements, but the rolling elements are not limited to the balls, and rollers may be used. In that case, in conformity with the shape of the rollers to be used, the rolling surface for the rolling elements may be formed into a curved surface shape in cross-section as in the case of the balls, or a merely planar shape.

The invention claimed is:

1. A motion guide device, comprising:
a raceway rail on which rolling elements roll along a longitudinal direction of the raceway rail;
a moving block which is assembled to the raceway rail through intermediation of a large number of the rolling elements, the moving block comprising an endless circulation path for the large number of the rolling elements and being movable along the raceway rail; and
spacers each interposed between adjacent ones of the large number of the rolling elements in the endless circulation path of the moving block,
wherein the moving block comprises:
a block body comprising:
a load rolling element path in which the large number of the rolling elements roll under load between the moving block and the raceway rail; and
a rolling element return path parallel to the load rolling element path; and
a pair of turning path forming members each comprising a direction turning path for coupling the load rolling element path and the rolling element return path to each other so as to form the endless circulation path, the pair of turning path forming members being fixed to the block body, and
wherein the direction turning path comprises:
a turning portion for continuously varying a rolling direction of the large number of the rolling elements; and
a preliminary turning portion which includes an outer surface formed in a linear shape that extends from the rolling element return path of the block body and is continuous with the rolling element return path so as to couple the rolling element return path and the turning portion to each other, the preliminary turning portion allowing the spacers to move in a curved form while linearly guiding the large number of the rolling elements.

2. The motion guide device according to claim 1,
wherein an inner peripheral side guide curved surface of the direction turning path comprises a compound curved surface including a plurality of curved surfaces having different curvatures in cross-section of the direction turning path in a plane comprising the endless circulation path, and
wherein start points of the inner peripheral side guide curved surface are displaced toward the load rolling element path and the rolling element return path with respect to a start point of the turning portion.

3. The motion guide device according to claim 2, wherein the inner peripheral side guide curved surface is formed into an elliptical shape.

4. The motion guide device according to claim 2, wherein an outer peripheral curved surface of the turning portion of the direction turning path is formed into a circular-arc curved surface having a uniform curvature.

5. The motion guide device according to claim 4,
wherein the plurality of curved surfaces of the compound curved surface of the inner peripheral side guide curved surface include circular-arcs of three types which respectively have different curvatures, and
wherein the curved surface positioned at a center is concentric with the outer peripheral curved surface of the turning portion.

6. The motion guide device according to claim 5, wherein, of the curves surfaces of the three types of the inner peripheral side guide curved surface, the curved surface positioned at the center has a smallest curvature radius, and the curved surface positioned on the rolling element return path side has a largest curvature radius.

7. The motion guide device, comprising:
a raceway rail on which rolling elements roll along a longitudinal direction of the raceway rail;
a moving block which is assembled to the raceway rail through intermediation of a large number of the rolling elements, the moving block comprising an endless circulation path for the large number of the rolling elements and being movable along the raceway rail; and
spacers each interposed between adjacent ones of the large number of the rolling elements in the endless circulation path of the moving block,
wherein the moving block comprises:
a block body comprising:
a load rolling element path in which the large number of the rolling elements roll under load between the moving block and the raceway rail; and
a rolling element return path parallel to the load rolling element path; and
a pair of turning path forming members each comprising a direction turning path for coupling the load rolling element path and the rolling element return path to each other so as to form the endless circulation path, the pair of turning path forming members being fixed to the block body, and
wherein the direction turning path comprises:
a turning portion for continuously varying a rolling direction of the large number of the rolling elements; and
a preliminary turning portion which is extended from the rolling element return path of the block body so as to couple the rolling element return path and the turning portion to each other, the preliminary turning portion allowing the spacers to move in a curved form while linearly guiding the large number of the rolling elements,
wherein the spacers form a coupler belt by being coupled to each other in a line with belt members,
wherein an inner wall of the endless circulation path of the moving block includes guide grooves for guiding the belt members (161) of the coupler belt along a circulating direction of the rolling elements,
wherein an inner peripheral side belt guide wall of each of the guide grooves comprises a compound curved surface including a plurality of curved surfaces having different curvatures in cross-section of the direction turning path in a plane comprising the endless circulation path, and wherein start points of the inner peripheral side belt guide wall are displaced toward the load rolling element path and the rolling element return path with respect to a start point of the turning portion.

8. The motion guide device according to claim 7, wherein the direction turning path comprises:

an entry zone continuous with the load rolling element path;

a leading zone continuous with the rolling element return path; and a guide zone provided between the leading zone and the entry zone, and wherein the curved surface of the inner peripheral side belt guide wall in the guide zone is concentric with an outer peripheral curved surface of the turning portion.

9. The motion guide device according to claim 8, wherein, of the plurality of curved surfaces of the inner peripheral side belt guide wall, the curved surface in the guide zone of the direction turning path has a smallest curvature radius.

10. The motion guide device according to claim 8, wherein an inner peripheral side guide curved surface in the guide zone of the direction turning path is concentric with the outer peripheral curved surface of the turning portion.

11. The motion guide device according to claim 10, wherein, of a plurality of curved surfaces of the inner peripheral side guide curved surface, a curved surface in the guide zone has a smallest curvature radius.

* * * * *